(12) United States Patent
Liu

(10) Patent No.: US 8,302,138 B2
(45) Date of Patent: Oct. 30, 2012

(54) METHOD OF REDUCING THE NUMBER OF REAL-TIME VIDEO TRANSCODINGS WITH ADAPTIVE SOURCING

(75) Inventor: Jinshui Liu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 264 days.

(21) Appl. No.: 12/817,974

(22) Filed: Jun. 17, 2010

(65) Prior Publication Data

US 2010/0325674 A1    Dec. 23, 2010

Related U.S. Application Data

(60) Provisional application No. 61/218,134, filed on Jun. 18, 2009.

(51) Int. Cl.
  *H04N 7/173* (2011.01)
(52) U.S. Cl. .............. 725/93; 725/86; 725/91; 725/105; 725/114; 725/115
(58) Field of Classification Search .................... 725/86, 725/91, 92, 105, 114, 115
See application file for complete search history.

(56) References Cited

U.S. PATENT DOCUMENTS

| | | |
|---|---|---|
| 6,407,680 B1 | 6/2002 | Lai et al. |
| 2005/0025064 A1 | 2/2005 | Chang et al. |
| 2009/0119322 A1 | 5/2009 | Mills et al. |
| 2010/0042747 A1 | 2/2010 | Hascalovici et al. |

FOREIGN PATENT DOCUMENTS

| | | |
|---|---|---|
| EP | 1672868 A1 | 6/2006 |
| EP | 1775935 A2 | 4/2007 |

OTHER PUBLICATIONS

"Series G: Transmission Systems and Media, Digital Systems and Networks, Transmission Media and Optical Systems Characteristics—Optical Fibre Cables, Definitions and Test Methods for Statistical and Non-Linear Related Attributes of Single-Mode Fibre and Cable," ITU-T G.650.2, Jul. 2007, 80 pages.
"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications," IEEE Std. 802.11, 2007, 1,232 pages.
"TransAct Transcoder," http://www.ripcode.connidownloads/TransAct_Transcoder_Datasheet.pdf, RipCode Inc., May 31, 2011, 3 pages.

(Continued)

*Primary Examiner* — Dominic D Saltarelli
(74) *Attorney, Agent, or Firm* — Conley Rose, P.C.; Grant Rodolph; Brandt Howell

(57) ABSTRACT

An apparatus comprising a video transcoding engine (VTE), a video source storage (VSS) coupled to the VTE, a network engine (NE) coupled to the VTE and in communications with a plurality of user devices, and a media management system (MMS) coupled to the VTE, the VSS, and the NE, and in communications with the user devices, wherein the VSS comprises an original video source (OVS) and an adaptive video source (AVS) that corresponds to the same video content, and wherein the AVS comprises a content format that is more frequently delivered to the user devices than a plurality of other delivered content formats of the video content other than the OVS.

14 Claims, 5 Drawing Sheets

OTHER PUBLICATIONS

IEEE Std 802.11w™-2009, "IEEE Standard for Information Technology—Telecommunications and Information Exchange Between Systems—Local and Metropolitan Area Networks-Specific Requirements, Part 11: Wireless LAN Medium Access Control (MAC) and Physical Layer (PHY) Specifications, Amendment 4: Protected Management Frames," IEEE Computer Society, Sep. 30, 2009, 111 pages.

Foreign communication from a counter-part application, PCT application PCT/US2010/039055, International Search Report dated Nov. 17, 2011, 5 pages.

Foreign communication from a counter-part application, PCT application PCT/US2010/039055, Written Opinion dated Nov. 17, 2011, 10 pages.

"Ripcode Client Detection Application," Ripcode Product Datasheet, 2008, 2 pages.

"Real-Time Streaming Transcoding," RipCode, Inc., 2009, 3 pages.

METHOD OF REDUCING THE NUMBER OF REAL-TIME VIDEO TRANSCODINGS WITH ADAPTIVE SOURCING

CROSS-REFERENCE TO RELATED APPLICATIONS

The present application claims priority to U.S. Provisional Patent Application No. 61/218,134 filed Jun. 18, 2009 by Jinshui Liu and entitled "Method of Reducing the Number of Real-Time Video Transcodings with Adaptive Sourcing", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Current video provider systems deliver video content to subscribers or users using different coding and decoding schemes for different user devices, such as televisions, notebook computers, and mobile devices. The video provider systems can support a plurality of video coder/decoders (CODECS), video media players, video resolutions, video content bit-rates, video end-devices, or combinations thereof. For example, different video devices may support different video CODECs, different video resolutions, and/or different video content bit-rates. The video provider systems comprise video transcoding schemes that convert a video content from a source or original format to different formats, e.g. using different CODECs, which can be supported by the different user devices.

SUMMARY

In one embodiment, the disclosure includes an apparatus comprising a video transcoding engine (VTE), a video source storage (VSS) coupled to the VTE, a network engine (NE) coupled to the VTE and in communications with a plurality of user devices, and a media management system (MMS) coupled to the VTE, the VSS, and the NE, and in communications with the user devices, wherein the VSS comprises an original video source (OVS) and an adaptive video source (AVS) that corresponds to the same video content, and wherein the AVS comprises a content format that is more frequently requested by the user devices than a plurality of other delivered content formats of the video content excluding the OVS.

In another embodiment, the disclosure includes a network component comprising at least one processor coupled to a memory and configured to receive a request for a video content from a user device, deliver an OVS of the video content to the user device if the user device supports the format of the OVS, deliver an AVS that comprises the most frequently requested and delivered format of the video content to the user device if the user device supports the format of the AVS, and deliver a generated content format of the video content if the user device does not support the content format of the OVS and the content format of the AVS.

In yet another embodiment, the disclosure includes a method comprising storing an OVS and a corresponding AVS for a video content in at least one VSS, and delivering the OVS or the AVS to a plurality of user devices that request the video content and that support the content format of the OVS or the content format of the AVS, wherein the AVS is more frequently requested and delivered to the user devices than any other generated content formats of the video content, and wherein the VSS comprises only one or only two AVSs.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
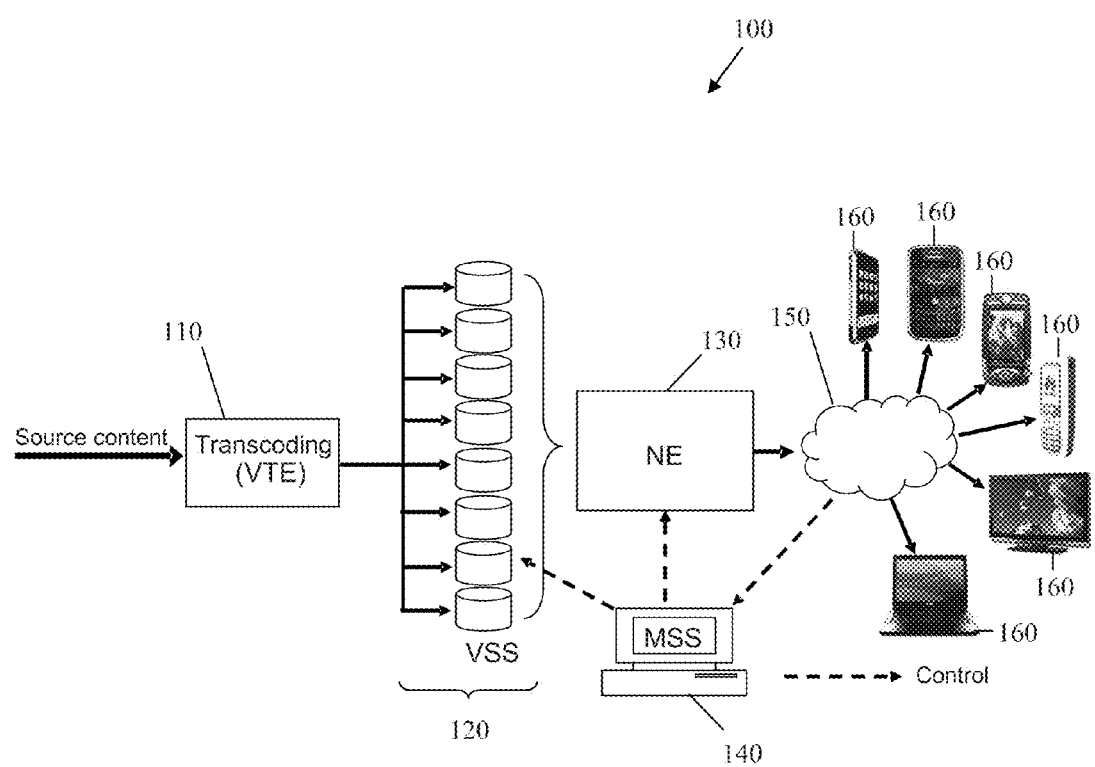
FIG. 1 is a schematic diagram of an embodiment of a video transcoding system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Generally, video content may be provided to different user devices, e.g. different televisions and/or mobile devices, using two schemes. The first scheme is based on Static Video Transcoding (SVT), where an OVS is converted into a plurality of video files in different formats. The video files are then stored in a storage media, where any of the video files can be selected according to the user device and delivered upon request. However, the SVT scheme may require a substantial amount of time to generate the different formats from the OVS prior to storing the video files and a substantial amount of storage space to store the video files in different formats. Therefore, the SVT scheme may be demanding in terms of system storage requirements. The second scheme is based on Real-Time On-Demand Video Transcoding (RTVT), where only the original video content is stored. In some cases, the video content may be delivered to the user in its original format, e.g. without conversion, if the user device supports the original format. However, in most cases the original content is converted into the user's format and then delivered to the user, e.g. in real-time. Typically, the RTVT scheme requires less storage space than the SVT scheme, but more processing speed and power, e.g. to convert the video content in real-time. Therefore, the RTVT scheme may be less demanding than the SVT scheme in terms of system storage requirements, but more demanding in terms of system cost.

Disclosed herein is a system and method for providing video content to a plurality of different user devices, e.g. in real-time. The system may store an OVS, which may be converted into a suitable format that matches a user device, if necessary, and then delivered to the user, e.g. in real-time. Additionally, the system may store an AVS that corresponds to a requested and delivered format of the OVS. The AVS may correspond to the most frequently requested/delivered format of the OVS other than the OVS itself and may be changed, e.g. in a dynamic manner, based on the changing frequencies of request/delivery of the different formats. Subsequently, the stored AVS that corresponds to the most frequently requested/delivered format excluding the OVS itself may be delivered if it is supported by a requesting user device without further processing, e.g. instead of converting and delivering an OVS format. The system may require less storage space than the SVT based system and less processing speed/power than the RTVT based system, which may reduce storage requirements, system cost, or both.

FIG. 1 illustrates an embodiment of a video transcoding system 100 that may use the SVT scheme to provide video content to different user devices. The video transcoding system 100 may comprise a VTE 110, a VSS 120 coupled to the VTE 110, a NE 130 coupled to the VSS 120, and a MMS 140 coupled to the VSS 120 and the NE 130. The video transcoding system 100 may be coupled to a communications network 150, which may be in communications with a plurality of user devices 160.

The VTE 110 may be a pre-processing component that is configured to process a source content, which comprises an OVS, to generate a plurality of different video or content formats of the OVS. The different content formats may be supported by different user devices 160. The VTE 110 may comprise hardware, software, or both, that performs video transcoding to convert the source file or the OVS, e.g., using different CODECs, into the different video or content formats. For instance, the VTE 110 may comprise a digital signal processor (DSP), or a general purpose microprocessor such as an x86 microprocessor, to perform digital signal processing to encode and/or decode video content from one format to another format. The different content formats may then be sent to the VSS 120. In some embodiments, the VTE 110 may be part of the NE 130.

The VSS 120 may be configured to store the different content formats of the OVS and maintain the files. For instance, the VSS 120 may be located on at least one server (e.g. computer) and/or storage unit (e.g. hard disk) in the video transcoding system 100. For example, the VSS 120 may be a memory device or component, such as flash memory, random access memory (RAM), or a hard drive or hard drives or redundant array of independent disks (RAID) that stores the OVS files and that may be accessed by other components of the transcoding system 100, e.g. the VTE 110, the NE 130, and the MMS 140.

The NE 130 may be configured to perform networking functions for the video transcoding system 100, such as frame encapsulation, network security enforcement, quality of service (QoS) control, and/or other networking functions. For instance, the NE 130 may comprise a network processing unit (NPU) or a microprocessor that has networking processing capabilities. The NE 130 may receive requests for video content from the MMS 140 that correspond to the user devices 160 and deliver the appropriate content formats from the VSS 120 to a user device 160, e.g. via communications network 150. The NE 130 may also communicate with the MMS 140 to identify the appropriate content formats that correspond to the different user devices 160. In some embodiments, the NE 130 may be part of the VTE 110.

The MMS 140 may be configured to manage a plurality of video contents, the content formats for a video content, and any user requests for video content in the video transcoding system 100. The MMS 140 may be a computer system that controls the operations of the VTE 110, the VSS 120, and the NE 130 to support video content management, handling user requests, and delivering the requested contents to the user devices 160. For instance, the MMS 140 may communicate with the communications network 150 to receive video content requests from the user devices 160, identify the content formats in the VSS 120 that correspond to the user devices 160, and instruct the NE 130 to send the appropriate content formats to the user devices 160.

The communications network 150 may be any network that provides video content to the user devices 160, such as a service provider network or an access network. The communications network 150 may communicate with the user devices 160 via wireless connections, fixed electrical or optical connections, or both. For instance, the communications network 150 may comprise a wireless access network, such as a Third Generation Partnership Project (3GPP) network, 3GPP2, or an Institute of Electrical and Electronics Engineers (IEEE) 802.11 Wireless Local Area Network (WLAN), also referred to as WIFI network, which communicates with at least some of the user devices 160, such as mobile or wireless devices. The communications network 150 may comprise or may be coupled to an Internet service provider (ISP), a network service provider (NSP), an application service provider (ASP), or combinations thereof. As such, the communications network 150 may provide video contents to the user devices 160 in the form of Internet Protocol (IP) packets. In some embodiments, the communications network 150 may comprise an IP network, an Ethernet transport network, a backbone network, an access network, an optical network, a wire-line network, an Institute of Electrical and Electronics Engineers (IEEE) 802 standard network, a wireless network, any other network, or combinations thereof.

The user devices 160 may be any devices capable of transmitting or receiving signals to and from the communications network 150, such as electrical or optical signal. In an embodiment, a user device 160 may be any user mobile device, component, or apparatus that communicates with the communications network 150 using a wireless link. For example, the user device 160 may be a mobile phone, a personal digital assistant (PDA), a portable computer, or any other wireless device. As such, the user device 160 may comprise an infrared port, a Bluetooth interface, an IEEE 802.11 compliant wireless interface, or any other wireless communication system that enables the user device 160 to communicate wirelessly with the communications network 150. Accordingly, the wireless link may be an IEEE 802.11 (or Wi-Fi) link, a Bluetooth link, a Worldwide Interoperability for Microwave Access (WiMAX) link, a near field communication (NFC) link, an Infrared Data Association (IrDa) link, or any other communication link established using wireless technology.

In another embodiment, the user device 160 may exchange signals with the communications network 150 using a fixed link, such as a wired cable or a fiber optic cable. The fixed link may implement Ethernet, Asynchronous Transfer Mode (ATM), IP, or any other suitable protocol. The user device 160 may be a fixed device, including a personal computer (PC) such as a desktop computer, a telephone such as a voice over IP (VoIP) telephone, or a set top box. In some embodiments, the user device 160 may be a portable device, such a laptop computer, or a cordless phone, which may use the fixed link to communicate with the communications network 150.

In typical SVT based systems, the VSS 120 may accommodate up to about 60 or about 70 format files for each OVS file. Such large amounts of content may require a substantial amount of storage space and increase the complexity of video content managing in the video transcoding system 100. The video transcoding system 100 may provide stored video content to the user devices 160 upon demand or request, as described above. However, the SVT based system may not be suitable for providing video content in real-time or live streaming applications, since the content format supported by a requesting user device 160 may not be available while the live video content is being streamed.

Figure 2:
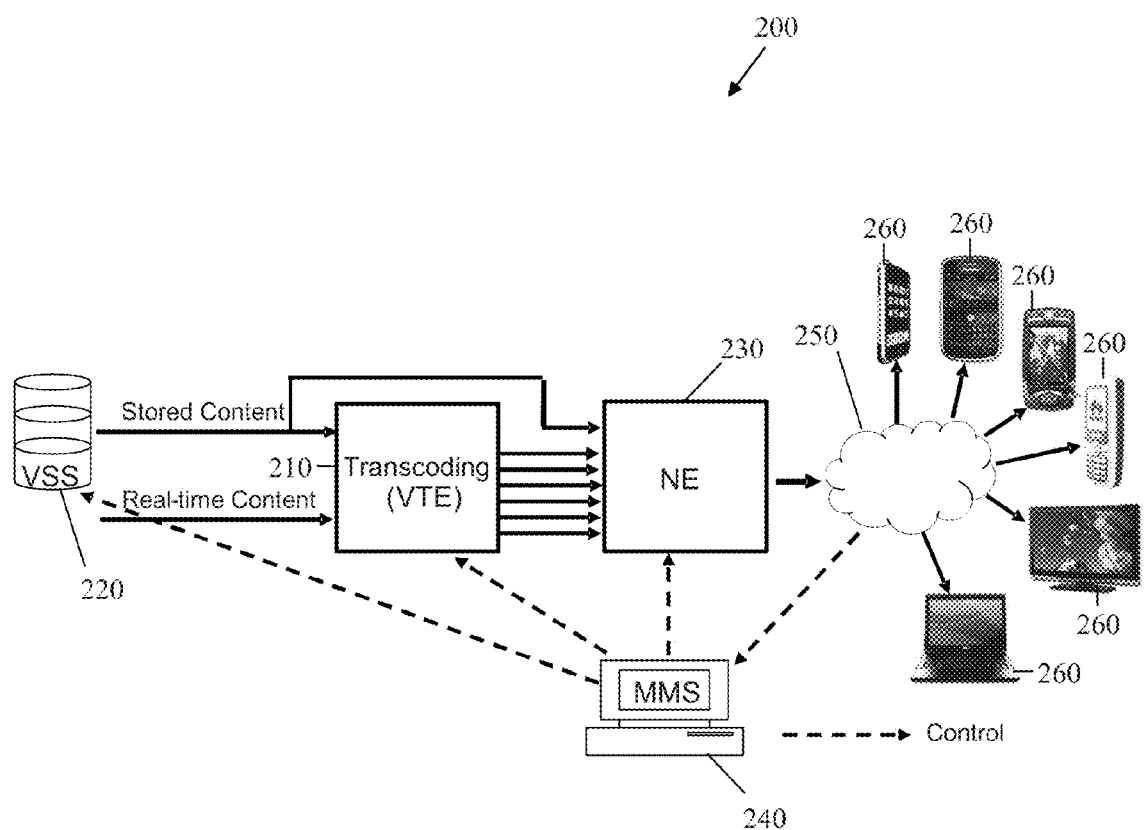
FIG. 2 is a schematic diagram of another embodiment of a video transcoding system.

FIG. 2 illustrates another embodiment of a video transcoding system 200 that may use the RTVT scheme to provide video content to different user devices. The video transcoding system 200 may comprise a VTE 210, a VSS 220 coupled to the VTE 210, a NE 230 coupled to the VTE 210 and the VSS 220, and a MMS 240 coupled to the VTE 210, the VSS 220, and the NE 230. The video transcoding system 200 may be coupled to a communications network 250, which may be in communications with a plurality of user devices 260. The components of the video transcoding system 200 may be configured substantially similar to the corresponding components of the video transcoding system 100, but may interact with each other to implement the RTVT scheme instead of the SVT scheme.

The VSS 220 may be configured to store a copy of an OVS or source file that corresponds to a video content, for instance during the live streaming of the video content. The VTE 210 may process the OVS or source file in real-time, if necessary, to generate an appropriate video or content format of the OVS for each user device 260 that requests to receive the live video content. The VTE 210 may either forward the OVS, e.g. in real-time, to the requesting user device 260 if the OVS format is supported by the user device 260 or may generate and forward a suitable content format to the user device 260 if the user device 260 does not support the OVS format. The VTE 210 may forward different content formats of the OVS to the NE 230, which may deliver the content formats via the communications network 250 to the corresponding user devices 260 in substantially real-time. For example, the content formats may be delivered at a relatively short delay from the time of streaming the live video content. The delay in time may be due to processing the OVS and generating the content formats supported by the user devices 260.

The MMS 240 may communicate with the VTE 210, the VSS 220, and the NE 230 to manage the live video content request and delivery. The MMS 240 may determine whether the OVS may be forwarded directly, e.g. without the VTE 210 processing, to the requesting user device 260 or may be instead processed by the VTE 210 to forward a suitable format to the requesting user device 260.

The video transcoding system 200 may consume less storage space (e.g. at the VSS 220) but require more process/speed resources (e.g. at the VTE 210) than the video transcoding system 100. Such RTVT based systems may have a relatively high cost, e.g. in both capital expenses and operating expenses. For example, the video transcoding system 200 may comprise (e.g. at the VTE 210) a TRANSACT Transcoder V5 manufactured by RIPCODE, which may use about 16 DSPs manufactured by Texas Instruments to handle about 48 quarter video graphics array (QVGA)/common intermediate format (CIF) user channels. In such a case, each user channel may incur about $100 of capital expenses for operation.

Another embodiment of a video transcoding system may use a Scalable Video Coding (SVC) scheme to provide different video content formats to different user devices. The SVC scheme has been proposed as an extension to H.264/MPEG-4 audio video coding (AVC), by Joint Video Team. The SVC scheme uses a plurality of layers to represent a video content, where different user devices may use different numbers of layers to support different video quality, resolution, and/or bit-rate. However, the SVC scheme may not be backward compatible due to the difficulty of reverting back the generated content formats to the OVS format, and may have relatively high CODEC cost.

Figure 3:
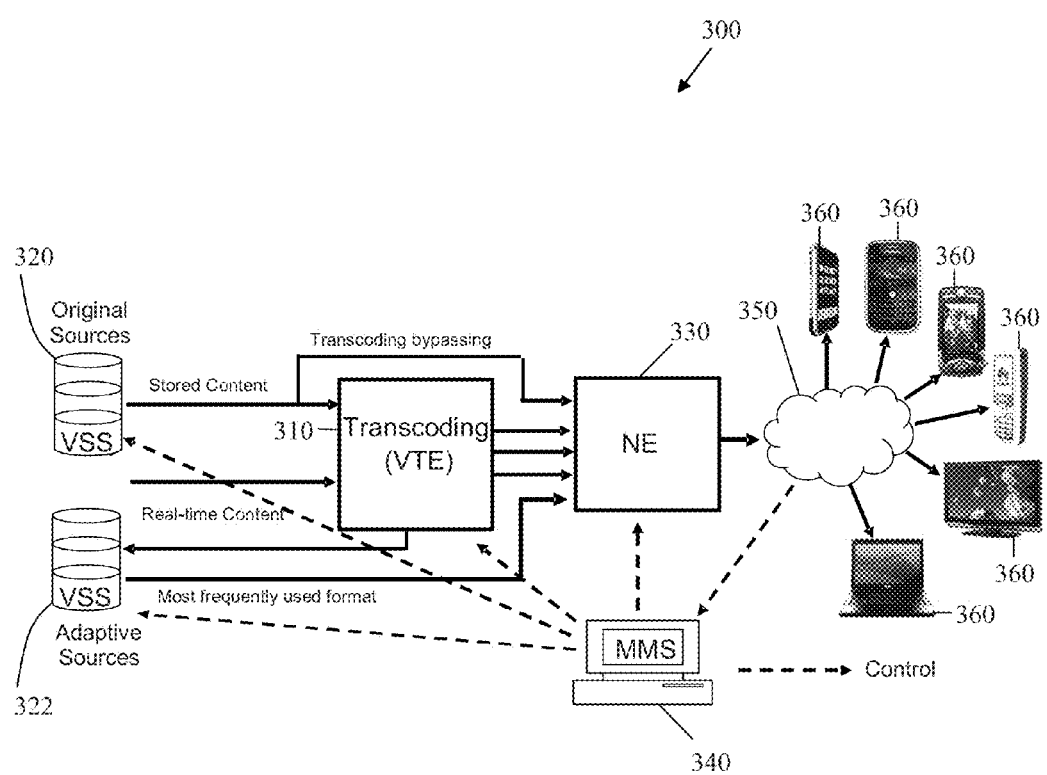
FIG. 3 is a schematic diagram of another embodiment of a video transcoding system.

FIG. 3 illustrates an embodiment of an improved video transcoding system 300 that may use adaptive video sourcing (AVS) to provide video content to different user devices, e.g. in real-time. The video transcoding system 300 may comprise a VTE 310 and a VSS 320, and optionally a second VSS 322 that may be both coupled to the VTE 310. The video transcoding system 300 may also comprise a NE 330 coupled to the VTE 310, and a MMS 340 coupled to the VTE 310, the VSS 320, and the NE 330. Additionally, the video transcoding system 300 may be coupled to a communications network 350, which may be in communications with a plurality of user devices 360. The components of the video transcoding system 300 may be configured substantially similar to the corresponding components of the video transcoding system 100. However, the components of the video transcoding system 300 may maintain an OVS and an AVS associated with the OVS to provide a video content to the user devices 360. The video transcoding system 300 may combine some aspects of both the SVT scheme and the RTVT scheme, as described below.

The VSS 320 may be configured to store a copy of the OVS, for instance during the live streaming of the video content. The VTE 310 may forward the OVS to a requesting user device 360 if the user device 360 supports the OVS format. If the user device 360 does not support the original format, then the VTE 310 may process the OVS, e.g. in real time while the live video content is streaming, to generate an appropriate content format and then forward the appropriate format. The VTE 310 may forward different content formats of the OVS to the NE 330, which may deliver the content formats via the communications network 350 to the corresponding user devices 360, for example in substantially real-time. As such, the video transcoding system 300 may deliver different content formats for the same OVS to different user devices, e.g. similar to the RTVT scheme.

Further, the second VSS 322 may be configured to store a copy of an AVS that corresponds to one of the generated and delivered content formats of the OVS. The second VSS 322 may be a component of the video transcoding system 300 that is substantially similar to the VSS 320. For instance, the VSS 320 and the second VSS 322 may comprise separate storage units, such as hard disks, or may be separate parts of the same storage unit. In some embodiments, the video transcoding system 300 may not comprise a second VSS 322, and as such the OVS and the AVS may be stored in the VSS 320. The AVS may correspond to the most frequently requested/delivered format of the OVS other than the OVS itself, which may change over time in a dynamic manner depending on the changing frequencies of the requested/delivered content formats.

The MMS 340 may be configured to keep track of the frequencies of the delivered formats and determine the content format that has the highest frequency of requests, e.g. over predetermined periods of time. For instance, the MMS 340 may calculate periodically at each subsequent time period, such as equal to about few minutes, hours, days, or weeks the frequencies at which each of the generated content formats is requested/delivered, and hence change the AVS (e.g. at the second VSS 322) to the content format that has the highest calculated frequency of requests other than the OVS itself. Thus, the video transcoding system 300 may deliver the stored AVS, which may comprise the most frequently requested content format (e.g. during a time period) other than the OVS itself, without the VTE 310 processing the AVS. If the requesting user device 360 does not support the adaptive video request, then the VTE 310 may deliver the OVS directly if supported or a generated content format of the OVS if necessary, e.g. in real-time.

In an embodiment, the MMS 340 may perform user request statistics and may instruct the second VTE 310 to create or update the AVS in the second VSS 322, based on the statistics and any provisioned policies, to meet subsequent user requests without further video transcoding. In some embodiments, the video transcoding system 300 may store copies of a plurality of AVSs at the second VSS 322, such as about two or about three AVSs that correspond to different generated content formats of the OVS. The stored AVSs may correspond to the most frequently requested/delivered formats of the OVS other than the OVS itself and may be updated over time in a dynamic manner, as described above. Thus, the video transcoding system 300 may deliver the stored AVSs without further VTE 310 processing, e.g. similar to the RTVT scheme.

The video transcoding system 300 may require less storage space than a SVT based system, such as the video transcoding system 100, since the video transcoding system 300 may store and maintain an OVS and an AVS (or few AVSs) for a requested video content instead of a plurality of video formats for the video content. Additionally, the video transcoding system 300 may require less processing speed/power than a RTVT based system, such as the video transcoding system 200, since the VTE 310 may forward the stored AVS(s) more frequently and process the OVS to generate suitable content formats less frequently to serve the different user devices 360. For instance, the video transcoding system 300 may require fewer DSP processors or chips to handle the same number of video transaction requests (e.g. user channels) in comparison to the RTVT based system.

Figure 4:
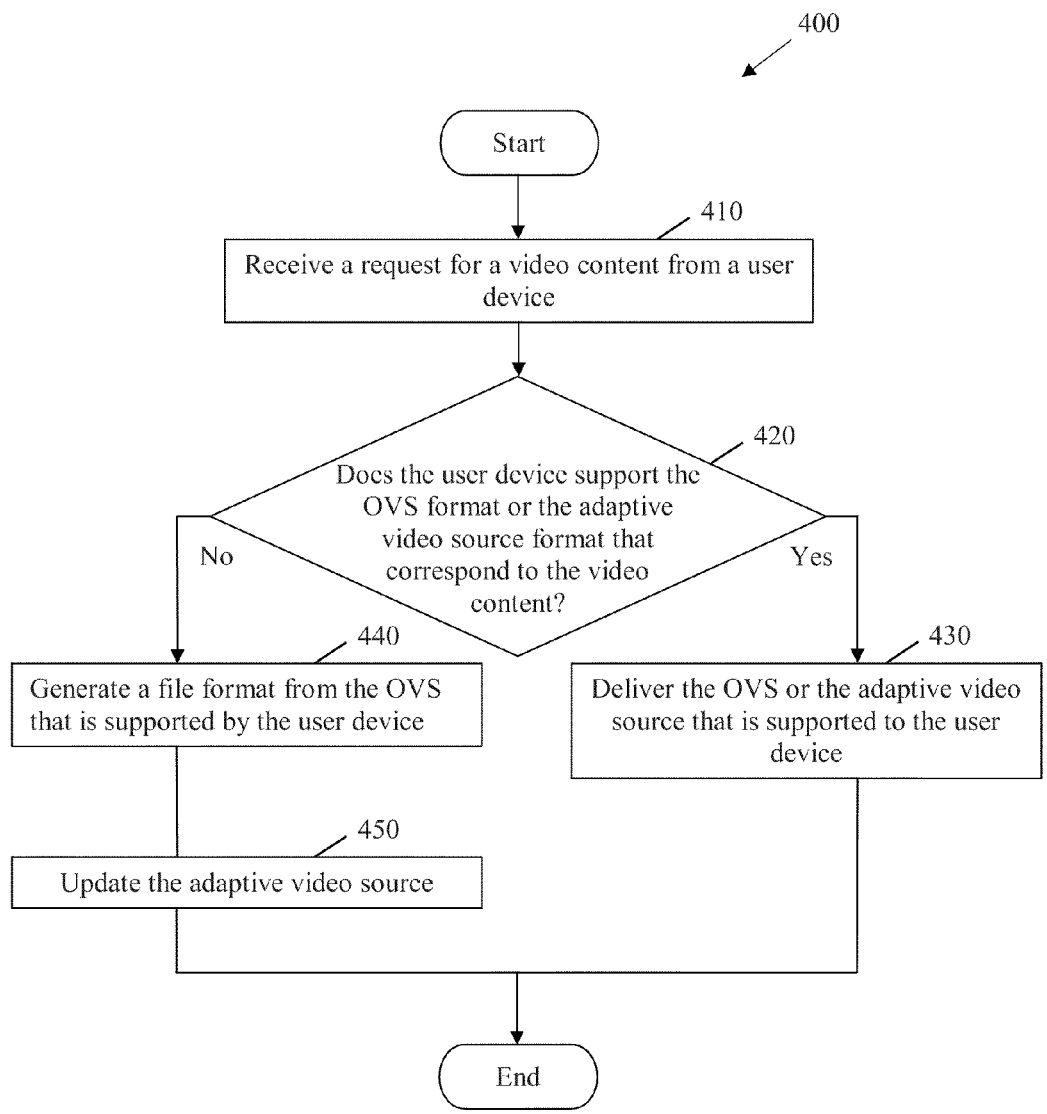
FIG. 4 is a schematic diagram of an embodiment of a video transcoding method.

FIG. 4 illustrates an embodiment of a video transcoding method 400 that may use an OVS and at least one AVS associated with the OVS to deliver video content to a plurality of user devices. For instance, the video transcoding method 400 may be used in the video transcoding system 300 to reduce the amount of required storage for appropriate content formats of the video content and reduce the necessary processing resources. The method 400 may begin at block 410, where a request for a video content may be received from a user device. For example, the MMS 340 may receive a request for a video content from a user device 360, via the communications network 350.

At block 420, the method 400 may determine whether the user device supports the OVS format or the AVS format that corresponds to the video content. For instance, the OVS and the AVS may be stored in the VSS (e.g. the VSS 320 and the second VSS 322). Alternatively, the OVS may correspond to a live streaming content. In some embodiments, there may be a plurality of stored AVSs in the VSS that represent different formats for the requested video content. As such, the method 400 may determine whether the OVS format or any of the stored AVSs is supported by the user device. In some cases, there may not be a stored AVS in the VSS that corresponds to the requested video content. As such, the method 400 may determine whether the OVS format is supported before proceeding to the next block. The method 400 may proceed to block 430 if the condition in block 420 is met, e.g. if either the OVS format or the AVS format is supported by the user device. Otherwise, the method 400 may proceed to block 440.

At block 430, the OVS or the AVS that is supported by the user device may be delivered. For instance, the NE 330 may deliver the OVS, e.g. in real time, or the AVS to the requesting user device 360 via the communications network 350. The method 400 may then end. Alternatively, at block 440 the content format that is supported by the user device may be generated from the OVS. For instance, the VTE 310 may generate a suitable content format for the requested video content from the OVS, e.g. in substantially real time. At block 450, the AVS may be updated. For instance, the MMS 340 may determine that the generated content format has the highest frequency of requests instead of the format of the stored AVS. Statistical analysis may be used to determine which content format has the highest frequency of requests. Consequently, the MMS 340 may change the AVS (in the VSS) to comprise the generated content format. However, the stored AVS may not be changed if the content format of the AVS remains the most frequently requested/delivered content format, e.g. after generating and delivering another suitable content format for the requesting user device. In the case where the VSS does not comprise an AVS for the requested video content, an AVS that comprises the generated content format may be added to the VSS. The method 400 may then end.

Figure 5:
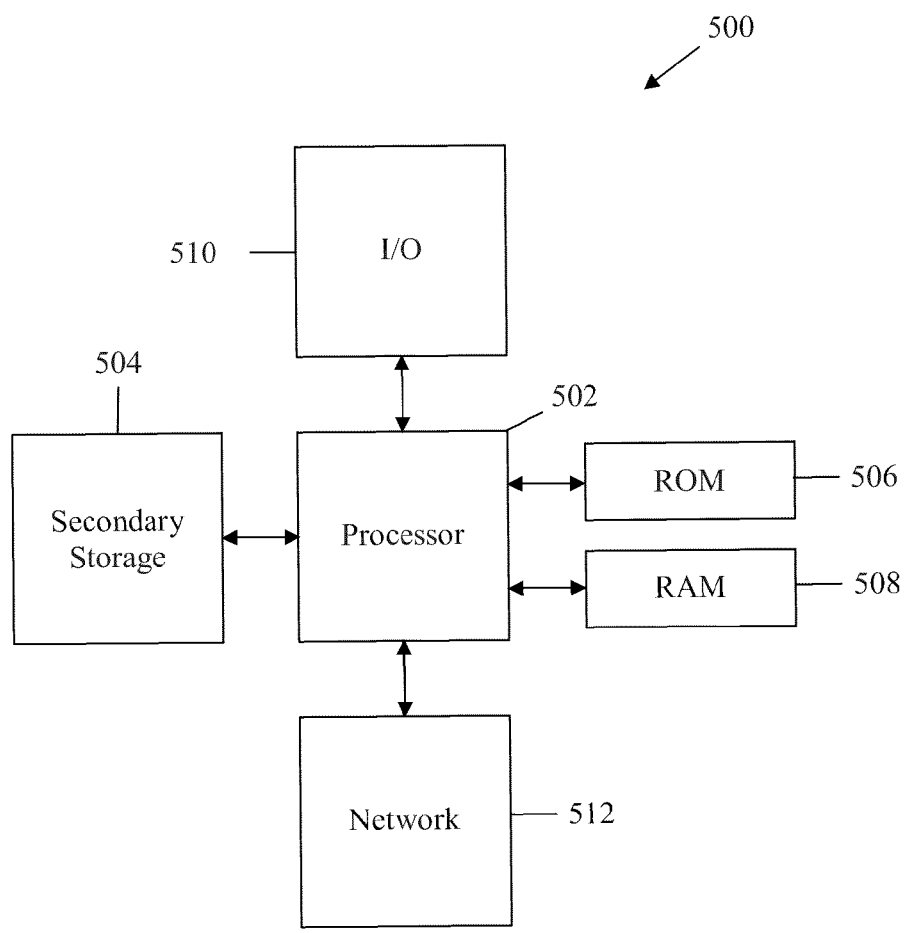
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives or not and (NAND) flash devices or a NAND flash storage system and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a video transcoding engine (VTE);
a video source storage (VSS) coupled to the VTE;
a network engine (NE) coupled to the VTE and in communications with a plurality of user devices; and
a media management system (MMS) coupled to the VTE, the VSS, and the NE, and in communications with the user devices,
wherein the VSS comprises an original video source (OVS) and a plurality of adaptive video sources (AVSs) that correspond to the same video content,
wherein the OVS is available in one of a plurality of available content formats,
wherein each AVS comprises a unique content format,
wherein the quantity of AVS content formats is less than the quantity of available content formats, and
wherein the AVS content formats comprise the available content formats most frequently requested by the user devices.

2. The apparatus of claim 1, wherein the VTE and the MMS communicate with the user devices via a communications network, and wherein at least some of the user devices are mobile devices that communicate with the communications network via a plurality of wireless links.

3. The apparatus of claim 1, wherein the VTE generates the content formats of the AVSs from the OVS.

4. The apparatus of claim 1, wherein the VSS comprises a first VSS unit that stores the OVS and a second VSS unit that stores the AVSs.

5. The apparatus of claim 1, wherein the MMS receives a plurality of requests from the user devices and instructs the VTE to deliver the OVS, an AVS, or other content formats of the video content to the user devices.

6. The apparatus of claim 1, wherein the MMS calculates a user request frequency with which the user devices request the available content formats and updates the content format of an AVS.

7. A network component comprising:
at least one processor coupled to a memory and configured to:
receive a request for a video content from a user device;
deliver an original video source (OVS) of the video content to the user device if the user device supports the format of the OVS;
deliver an adaptive video source (AVS) that comprises the most frequently requested and delivered format of the video content to the user device if the user device supports the format of the AVS, and
deliver a generated content format of the video content if the user device does not support the content format of the OVS and the content format of the AVS,
wherein the AVS comprises only one format, and wherein the processor is further configured to update the AVS to comprise the generated content format if the generated content format is more frequently requested and delivered than the format of the AVS.

8. The network component of claim 7, wherein the processor is further configured to deliver a second AVS that comprises the second most frequently requested and delivered format of the video content other than the OVS to the user device if the user device supports the format of the second AVS.

9. The network component of claim 7, wherein the OVS is delivered to the user device in real-time.

10. The network component of claim 7, wherein the AVS is stored and subsequently delivered to the user device without further video transcoding.

11. A network component comprising:
at least one processor coupled to a memory and configured to:
receive a request for a video content from a user device;
deliver an original video source (OVS) of the video content to the user device if the user device supports the format of the OVS;

deliver an adaptive video source (AVS) that comprises the most frequently requested and delivered format of the video content to the user device if the user device supports the format of the AVS, and deliver a generated content format of the video content if the user device does not su ort the content format of the OVS and the content format of the AVS, wherein the processor is further configured to update the AVS periodically at each subsequent time period that is predetermined, and wherein the AVS is changed to comprise the content format that is the most frequently requested and delivered over the time period other than the OVS.

12. A network component comprising:

at least one processor coupled to a memory and configured to:

receive a request for a video content from a user device;

deliver an original video source (OVS) of the video content to the user device if the user device supports the format of the OVS;

deliver an adaptive video source (AVS) that comprises the most frequently requested and delivered format of the video content to the user device if the user device supports the format of the AVS; and deliver a generated content format of the video content if the user device does not support the content format of the OVS and the content format of the AVS, wherein the processor is further configured to deliver a second AVS that comprises the second most frequently requested and delivered format of the video content other than the OVS to the user device if the user device supports the format of the second AVS, wherein the processor is further configured to update the second AVS periodically at each subsequent time period that is predetermined, and wherein the second AVS is changed to comprise the content format that is the second most frequently requested and delivered over the time period other than the OVS.

13. A method comprising:

storing an original video source (OVS) and a corresponding adaptive video source (AVS) for a video content in at least one video source storage (VSS);

delivering the OVS or the AVS to a plurality of user devices that request the video content and that support the content format of the OVS or the content format of the AVS; and updating the AVS in the VSS based on a plurality of statistics regarding the frequencies of requested and delivered content formats of the video content and any provisioned policies, wherein the AVS is more frequently requested and delivered to the user devices than any other generated content formats of the video content, and wherein the VSS comprises only one or only two AVSs.

14. The method of claim 13 further comprising adding the AVS to the VSS if the VSS does not comprise an AVS for the video content.

\* \* \* \* \*

UNITED STATES PATENT AND TRADEMARK OFFICE
CERTIFICATE OF CORRECTION

PATENT NO. : 8,302,138 B2
APPLICATION NO. : 12/817974
DATED : October 30, 2012
INVENTOR(S) : Jinshui Liu It is certified that error appears in the above-identified patent and that said Letters Patent is hereby corrected as shown below:

In the Claims

Column 10, line 61 - column 11, line 14, claim 11, should read as: "A network component comprising: at least one processor coupled to a memory and configured to: receive a request for a video content from a user device; deliver an original video source (OVS) of the video content to the user device if the user device supports the format of the OVS; deliver an adaptive video source (AVS) that comprises the most frequently requested and delivered format of the video content to the user device if the user device supports the format of the AVS, and deliver a generated content format of the video content if the user device does not support the content format of the OVS and the content format of the AVS, wherein the processor is further configured to update the AVS periodically at each subsequent time period that is predetermined, and wherein the AVS is changed to comprise the content format that is the most frequently requested and delivered over the time period other than the OVS."

Signed and Sealed this
Twenty-first Day of May, 2013

Teresa Stanek Rea
*Acting Director of the United States Patent and Trademark Office*